United States Patent
Baker

[11] Patent Number: 6,113,141
[45] Date of Patent: Sep. 5, 2000

[54] ROLL-OVER AIR BAG

[75] Inventor: Robert Scott Baker, Dandridge, Tenn.

[73] Assignee: American Components, Inc., Dandridge, Tenn.

[21] Appl. No.: 09/110,632

[22] Filed: Jul. 6, 1998

[51] Int. Cl.[7] .................................................. B60R 21/16
[52] U.S. Cl. ..................................... 280/743.2; 280/730.2
[58] Field of Search .............................. 280/743.2, 743.1, 280/728.1, 730.2, 730.1, 729

[56] References Cited

U.S. PATENT DOCUMENTS

| | | |
|---|---|---|
| 3,425,712 | 2/1969 | Berryman . |
| 3,807,754 | 4/1974 | Rodenbach et al. . |
| 3,879,056 | 4/1975 | Kawashima et al. ................. 280/743.2 |
| 3,897,961 | 8/1975 | Leising et al. ......................... 380/730.1 |
| 3,960,386 | 6/1976 | Wallsten . |
| 3,970,328 | 7/1976 | Wallsten . |
| 4,010,005 | 3/1977 | Morisaki et al. . |
| 4,963,412 | 10/1990 | Kokeguchi . |
| 5,114,180 | 5/1992 | Kami et al. . |
| 5,427,410 | 6/1995 | Shiota et al. ........................ 280/743.1 |
| 5,452,914 | 9/1995 | Hirai . |
| 5,501,259 | 3/1996 | Palm . |
| 5,505,485 | 4/1996 | Breed . |
| 5,524,926 | 6/1996 | Hirai et al. . |
| 5,529,332 | 6/1996 | Wipasuramonton . |
| 5,529,340 | 6/1996 | Fairbanks . |
| 5,540,460 | 7/1996 | Wipasuramonton . |
| 5,582,429 | 12/1996 | Heinz et al. ......................... 280/743.2 |
| 5,615,914 | 4/1997 | Galbraith et al. . |
| 5,618,595 | 4/1997 | Matsushima et al. . |
| 5,630,620 | 5/1997 | Hirai et al. . |
| 5,871,230 | 2/1999 | Lewis .................................... 280/743.1 |
| 5,909,895 | 6/1999 | Iino et al. . |

FOREIGN PATENT DOCUMENTS

| | | |
|---|---|---|
| 2552815 | 5/1977 | Germany . |
| 2-237837 | 2/1990 | Japan . |
| 2-31965 | 2/1990 | Japan . |
| 4-266544 | 4/1992 | Japan . |
| 4-356249 | 12/1992 | Japan . |
| 5-16751 | 1/1993 | Japan ................................. 280/730.2 |
| 2243119 | 10/1991 | United Kingdom ................ 280/743.2 |
| 2252983 | 8/1992 | United Kingdom . |
| 9118760 | 12/1991 | WIPO . |

*Primary Examiner*—Peter C. English
*Attorney, Agent, or Firm*—Pitts & Brittian, P.C.

[57] ABSTRACT

A roll-over airbag 10 having an upper fabric panel 15 and a lower fabric panel 20 perimetrically bonded to the upper fabric panel 15. This perimetric joint is reinforced with a lap joint 30 defining a reinforced interior seal. In order to limit the height and/or thickness of the roll-over airbag 10 by limiting the displacement of the upper and lower fabric panels 15 and 20 from one another during expansion of the roll-over airbag 10, at least one tether member 40 is disposed within roll-over airbag 10. Also a through-opening is defined by passageway 85 to permit passage of a seat belt through the roll-over airbag 10 while stored in a deflated condition. In the preferred embodiment, the passageway 85 is defined by a pleated channel member 90. The pleats 96 allow the channel member 90 to fold flat when the roll-over airbag 10 is deflated and allows substantially uniform expansion of the roll-over airbag 10 during inflation.

4 Claims, 5 Drawing Sheets

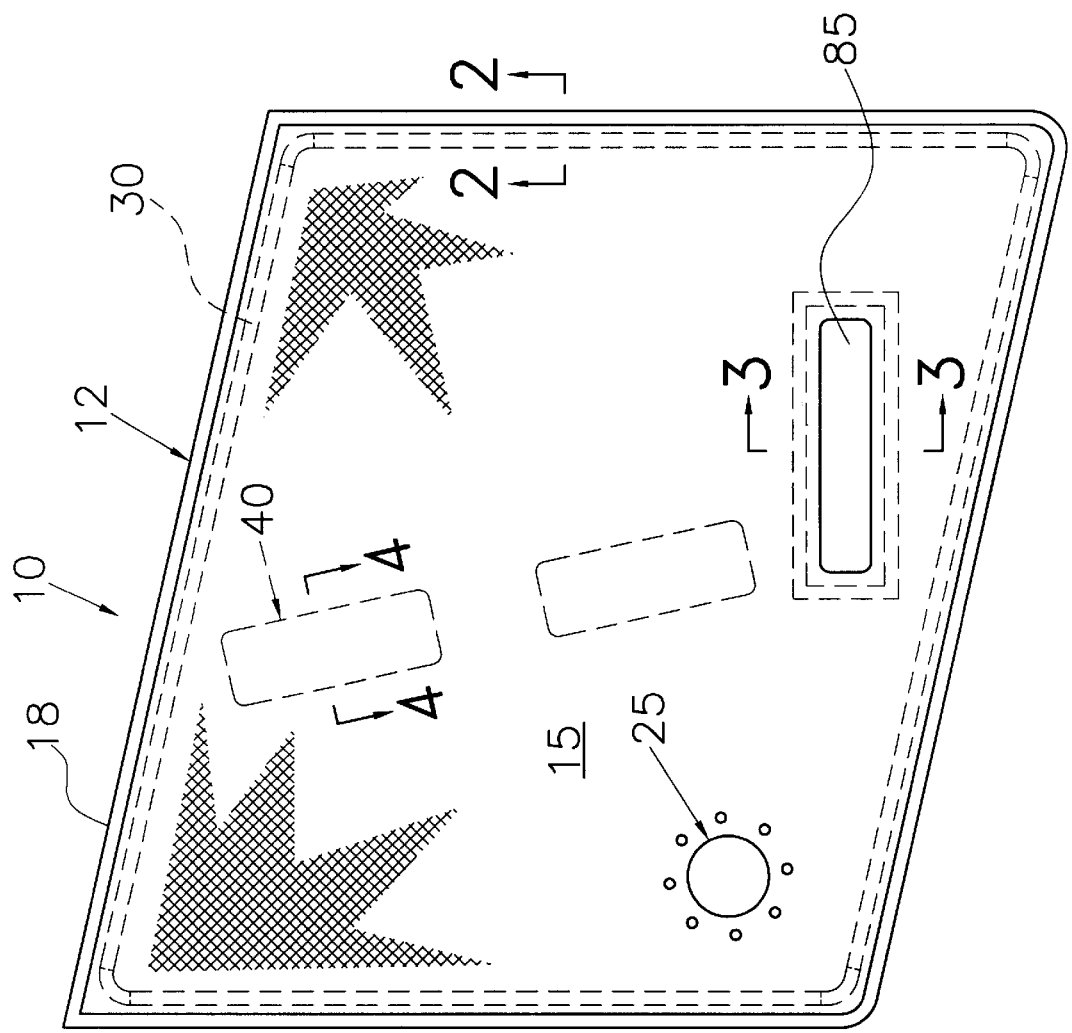

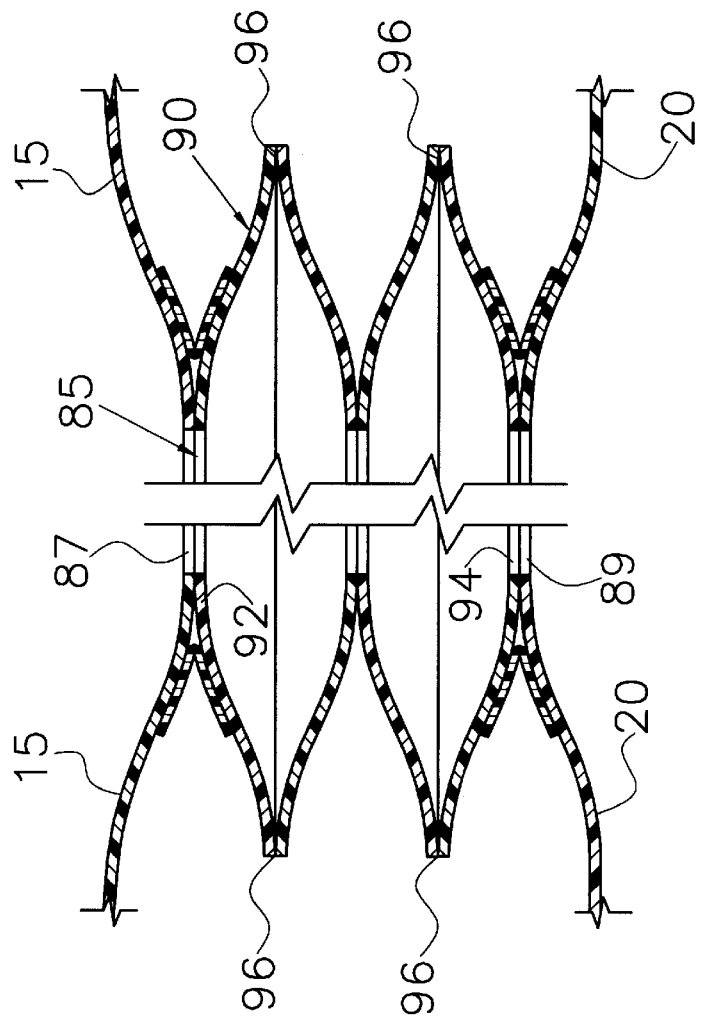
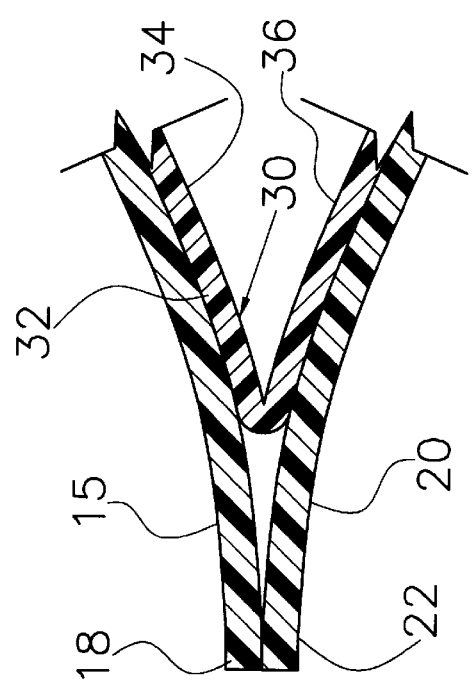
Fig.3
Fig.2

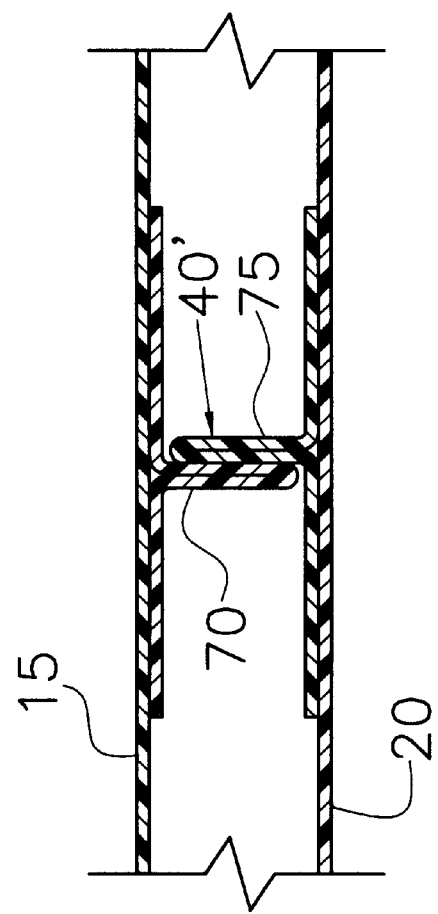
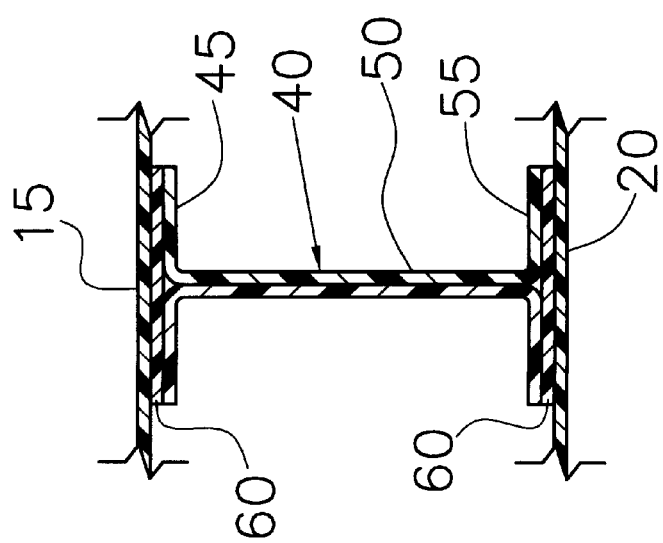
Fig. 5
Fig. 4

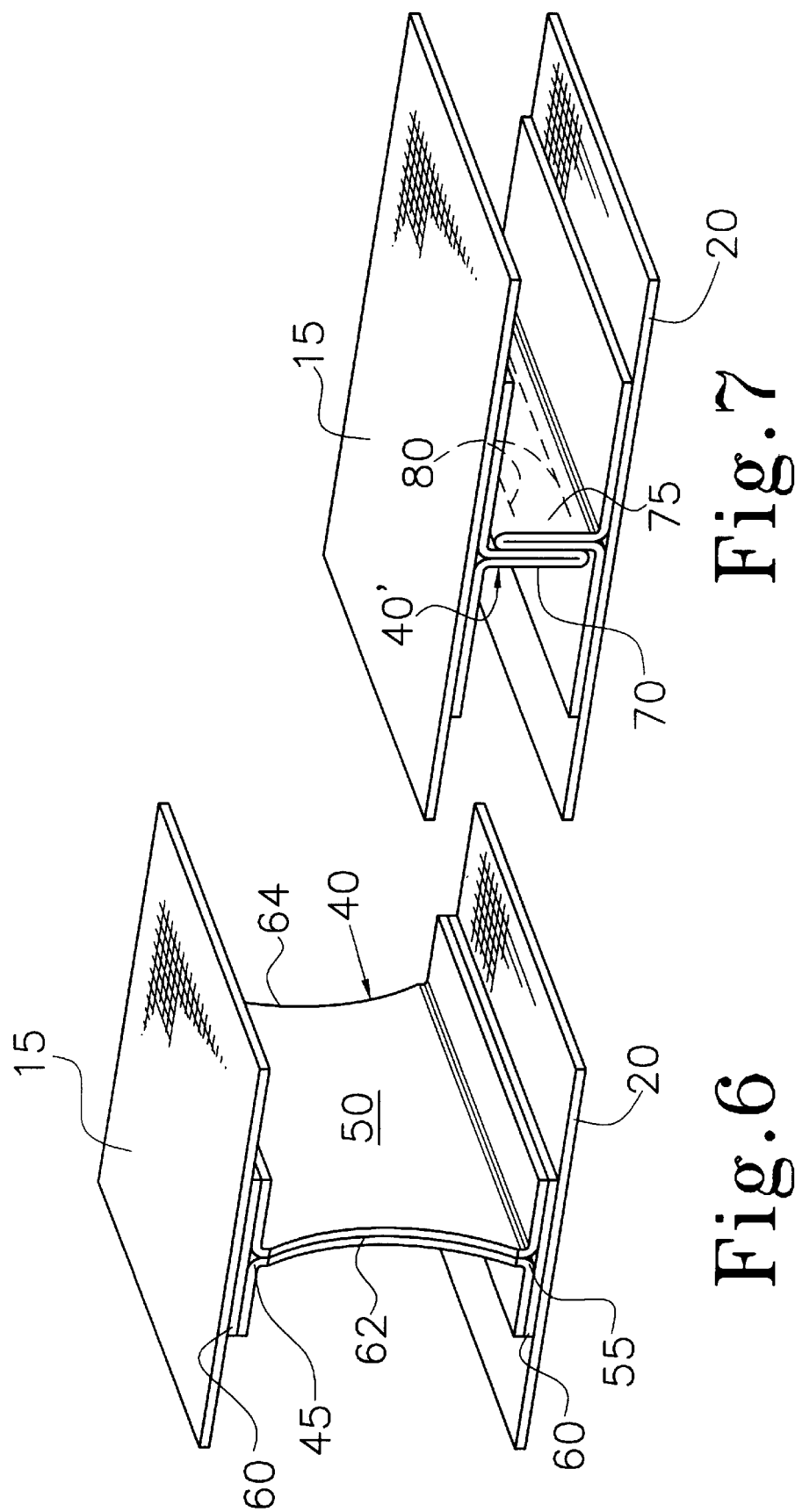

ROLL-OVER AIR BAG

TECHNICAL FIELD

This invention relates to the field of automotive restraints. More particularly, it relates to a self-inflating restraint for protecting occupants of an automobile in the event of a vehicle roll-over.

BACKGROUND ART

It is known in the art to protect the occupants of a vehicle with an inflated restraint commonly referred to as an airbag. The airbag is in fluid communication with an inflator, which when activated, rapidly inflates the airbag with an inflation fluid. Airbags have been in use for a number of years to protect the front occupants of a vehicle from impacting the steering wheel, dash and/or the windshield during a front impact incident. And, airbags have recently been utilized to protect the occupants striking the side of the vehicle during side-impact and/or roll-over episodes. For side-impact or roll-over airbags, the airbag is stored, either in the seat, in the side pillar, or in proximate the conjunction of the headliner and the side panel of the vehicle in a deflated, and often folded, condition. For example, U.S. Pat. No. 5,529,332 issued to Wipasuramonton on Jun. 25, 1996, and U.S. Pat. No. 5,540,460 issued to Wipasuramonton on Jul. 30, 1996, each disclose a side-impact airbag which is inflatable into a position between a vehicle occupant and the side structure of a vehicle.

Due to the configuration and placement of the seat belts in certain vehicles, it may be desirable to allow the seat belt to pass through an opening in the airbag. However, upon deployment of the airbag, the airbag can bind and become ensnared by the seat belt. Also, it is desirable to limit the displacement of the sides from each other during expansion. Further, those skilled in the art recognize that upon expansion a large amount of stress is placed upon the sealed edges of the airbag leading to potential rupture and failure of the airbag.

What has heretofore been missing from the art is a roll-over self-inflating restraint that is configured to allow a shoulder belt to pass through an opening in the airbag and maintain a uniform opening to prevent the airbag from binding on the seat belt; that has a series of internal tethers specifically designed to limit the displacement of the sides from one another during expansion; and that has perimetrically reinforced sealed edges.

Accordingly, it is an object of the present invention to provide a roll-over airbag that has a specially configured opening to allow a shoulder belt to pass through an opening in the airbag and that maintains a uniform size to prevent the airbag from binding on the seat belt during expansion.

Another object of the present invention is to provide a roll-over that has a series of internal, reinforced tethers specifically designed to limit the displacement of the sides from one another during expansion.

Still another object of the present invention is to provide a roll-over airbag that has perimetrically reinforced sealed edges.

Other objects and advantages over the prior art will become apparent to those skilled in the art upon reading the detailed description together with the drawings as described as follows.

DISCLOSURE OF THE INVENTION

In accordance with the various features of this invention, a roll-over airbag is provided. The roll-over airbag of the present invention is defined by an inflatable air bag constructed of an upper fabric panel having a perimeter of a pre-selected length and a lower fabric panel perimetrically bonded to the upper fabric panel. In the preferred embodiment, this joint is reinforced with a lap joint so as to distribute the stress of rapid inflation over a larger surface area of the fabric and thereby transform an otherwise tear stress into a shear stress. In the preferred embodiment, the fabric material is a woven nylon in which the interior has been treated, often with a neoprene coating, in order to be impermeable to the inflation fluid. At least one port opening is provided in the upper fabric panel for connecting the roll-over bag to an inflator to allow communication of the expansion fluid from the inflator to the roll-over airbag.

In addition to having perimeter reinforced inner seals, the roll-over airbag further includes at least one tether disposed within the airbag for limiting displacement of the upper and lower fabric panels from one another. The tether has a first end bonded to the upper fabric panel and a second end bonded to the lower fabric panel. The length of the tether is preselected in order to determine the thickness and/or height of the expanded roll-over airbag. In order to accommodate passage of a seat belt through the roll-over airbag, a passageway is disposed in the roll-over airbag. In this regard, an expandable through opening is provided in the roll-over airbag.

BRIEF DESCRIPTION OF THE DRAWINGS

FIG. 1 illustrates a top plan view of the roll-over airbag of the present invention.

FIG. 2 illustrates a partial cross-sectional view of the roll-over airbag taken at lines 2—2 in FIG. 1.

FIG. 3 illustrates a partial cross-sectional view of the roll-over airbag taken at lines 3—3 in FIG. 1.

FIG. 4 illustrates a partial cross-sectional view of the roll-over airbag taken at lines 4—4 in FIG. 1.

FIG. 5 illustrates a partial cross-sectional view of an alternate embodiment of the tether utilized in the present invention.

FIG. 6 illustrates a perspective view of the tether illustrated in FIG. 4.

FIG. 7 illustrates a perspective view of the tether illustrated in FIG. 5.

BEST MODE FOR CARRYING OUT THE INVENTION

Figure 8:
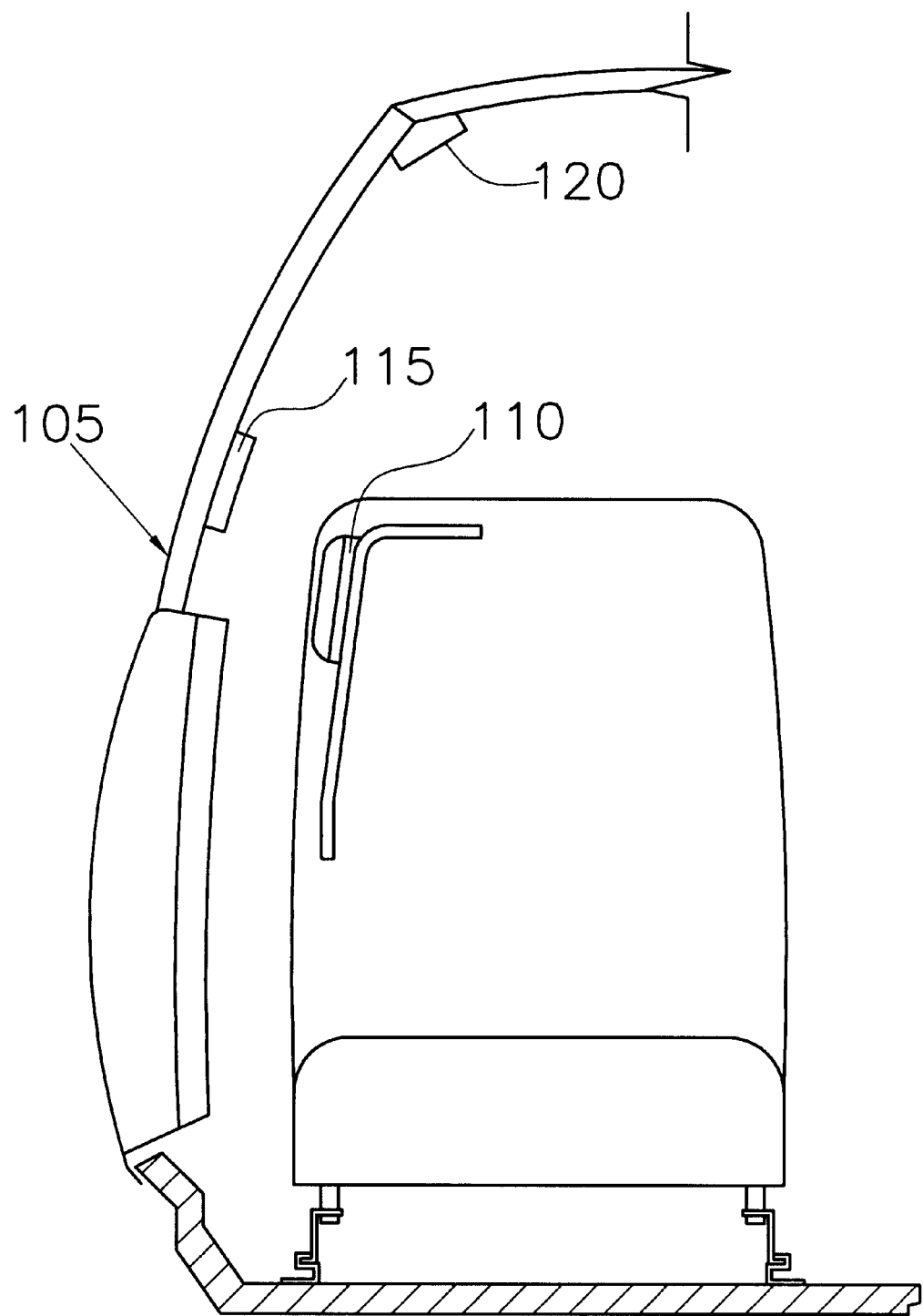
FIG. 8 illustrates a partial schematic view of the placement locations of the roll-over airbag of the present invention.

A roll-over airbag, constructed in accordance with the present invention, is illustrated generally as 10 in the figures. The roll-over airbag 10 is defined by an inflatable airbag 12 constructed of an upper fabric panel 15 having a perimeter 18 of a pre-selected length and a lower fabric panel 20 perimetrically bonded to the upper fabric panel 15. It should be understood that reference to upper and lower panels is simply for clarity of description and is not intended to limit the spatial orientation of the roll-over airbag 10. In the preferred embodiment, both the upper and lower fabric panels 15 and 20, respectively, are a woven nylon in which the interior has been treated, often with a neoprene coating, in order to be impermeable to the inflation fluid. However, other materials could be utilized so long as the result is an inflation fluid impermeable material. At least one port opening 25 is provided in the upper fabric panel 15 for connecting the roll-over bag 10 to an inflator (not shown) to allow communication of the expansion fluid (not shown) from the inflator to the roll-over airbag 10.

As mentioned above, the perimeter edges 18 and 22, respectively, of the upper and lower fabric panels 15 and 20 are bonded together. In the preferred embodiment, the upper and lower fabric panels 15 and 20 are secured by an ultrasonic or thermal weld. However, the upper and lower fabric panels 15 and 20 can also be secured by means of an adhesive which has a high degree of thermal stability. It will be recognized by those skilled in the art that the time for inflating and thus, expanding roll-over airbag 10 is measured in milliseconds, and that, as a result, a large amount of tear stress is placed upon the state of the art joint, or seal. In order to reinforce this joint, a lap joint 30 is utilized using an additional piece of fabric in order to distribute the stress over a larger surface area of the upper and lower fabric panels 15 and 20 and thereby transform the tear stress into a shear stress. In this regard, at least one securement member 32 is disposed proximate the perimeter seal such that the upper portion 34 of the securement member 32 is bonded to the upper fabric panel 15 and the lower portion 36 of the securement member 32 is bonded to the lower fabric panel 20.

It is often desirable to limit the height and/or thickness of the roll-over airbag 10 by limiting the displacement of the upper and lower fabric panels 15 and 20 from one another during expansion of the roll-over airbag 10. In order to achieve this effect, at least one tether member 40 is disposed within roll-over airbag 10 for limiting displacement of the upper and lower fabric panels 15 and 20 from one another. In this regard, the tether 40 has a first end 45 bonded to the upper fabric panel 15, a center panel 50, and a second end 55 bonded to the lower fabric panel 20. In the preferred embodiment the center panel has a preselected height selected to limit the thickness of the roll-over airbag 10 to a range of approximately 2.5" to approximately 3.5". As shown in FIGS. 4 and 6, the ends 45 and 55 of the tether 40 can be bonded to a substrate 60 which is in turn bonded to the upper or lower fabric panel 15 or 20 in order to reduce the risk of rupture and to strengthen the bond between the tether 40 and the upper and lower fabric panels 15 and 20. As seen in FIG. 4, the tether 40, in the preferred embodiment is at least a two ply fabric member and has a substantially I-shaped cross-section. Further, to distribute the stress of expansion over a larger surface area of the ends 45 and 55 of the tether 40, the edges 62 and 64 of the center panel 50 have a substantially concave configuration.

In FIGS. 5 and 7, an alternate embodiment of a tether is illustrated as tether 40'. Tether 40' is utilized in applications in which it is desirable to limit the thickness of the roll-over airbag 10 to a range of approximately 0.75" to approximately 1.5". In this regard, tether 40' is defined by a first folded fabric member 70 which is bonded to the upper fabric panel 15 and a cooperating second folded fabric member 75. The folded portions of first folded fabric member 70 and second folded fabric member 75 are secured to one another by a securement member 80, which in the preferred embodiment is defined by parallel rows of stitching. Further, to distribute the stress of expansion over a larger surface area, the terminal ends of securement member 80, are not coextensive with the edges of the first and second folded fabric members 70 and 75. In this regard, first and second folded fabric members 70 and 75 have a first preselected width and securement member 80 has a second preselected width which is less than the preselected width of first and second folded fabric members 70 and 75.

Those skilled in the art will appreciate that as illustrated in FIG. 8, there are numerous places in vehicle 105 that roll-over airbag 10 can be stored. For instance, roll-over airbag 10 can be stored in the seat back at 110, in the side pillar at 115 or proximate the headliner at 120. In certain applications, it is desirable to store roll-over airbag 10 at 110 in a manner that permits a seatbelt, (not shown), to pass through the roll-over airbag 10 while folded. In order to accommodate passage of a seat belt through the roll-over airbag 10, a passageway 85 is disposed in the roll-over airbag 10. In this regard, a first opening 87 is provided in the upper fabric panel 15 and a second opening 89 is provided in the lower panel 20 with the first opening 87 and the second opening 89 being in register. In order to maintain the impermeability of the roll-over airbag, a channel member 90 is provided that registers with the first opening 87 and the second opening 89. The channel member 90 has an upper end 92 bonded to the upper fabric panel 15 and a lower end 94 bonded to the lower fabric panel 20, thus providing a through-opening in the roll-over airbag 10. In order to allow the roll-over air bag 10 to expand uniformly in the proximity of the passageway 85, the channel member 90 is expandable. In the preferred embodiment expansion of the channel member 90 is accomplished by providing at least one pleat 96 in the channel member 90. The pleats 96 allow the channel member 90 to fold flat when the roll-over airbag 10 is deflated and allows substantially uniform expansion of the roll-over airbag 10 during inflation.

From the foregoing description, it will be recognized by those skilled in the art that a roll-over airbag offering advantages over the prior art has been provided. Specifically, the roll-over airbag of the present invention provides a roll-over airbag having a perimeter reinforced seal and that has a specially configured opening to allow a seat belt to pass through an opening in the airbag and that maintains a uniform size to prevent the airbag from binding on the seat belt during expansion. The roll-over airbag of the present invention also provides at least one internal, reinforced tether specifically designed to limit the displacement of the sides of the roll-over airbag from one another during expansion of the roll-over airbag.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A roll-over airbag for an automobile self-inflating restraint system, said roll-over airbag comprising:

a first woven fabric panel having a perimeter of a preselected length, said woven fabric incorporating a weldable coating so as to be impervious to an expansion fluid;

a second woven fabric panel perimetrically bonded to said first fabric panel, said woven fabric incorporating a weldable coating so as to be impervious to an expansion fluid;

at least one port opening provided in said first fabric panel for connecting said roll-over airbag to an inflator to allow communication of an expansion fluid from the inflator to said roll-over airbag;

a reinforced perimeter seal of said preselected length, wherein said reinforced perimeter seal is reinforced by at least one securement member disposed proximate said perimeter, wherein each said at least one securement member has an upper portion bonded to said first fabric panel and a lower portion bonded to said second fabric panel thereby distributing stress associated with expansion of said roll-over airbag over a larger surface area such that a tear stress is transformed by said at least one securement member into a shear stress; and at least one tether disposed within said airbag for limiting displacement of said first and second fabric panels from one another, wherein said at least one tether is defined by at least a two-ply member defining a I-shaped cross section and having a first end bonded to said first fabric panel and a second end bonded to said second fabric panel and defining concave edge portions.

2. A roll-over airbag for an automobile self-inflating restraint system, said roll-over airbag comprising:

a first woven fabric panel having a perimeter of a pre-selected length, said woven fabric incorporating a weldable coating so as to be impervious to an expansion fluid;

a second woven fabric panel perimetrically bonded to said first fabric panel, said woven fabric incorporating a weldable coating so as to be impervious to an expansion fluid;

at least one port opening provided in said first fabric panel for connecting said roll-over airbag to an inflator to allow communication of an expansion fluid from the inflator to said roll-over airbag;

a reinforced perimeter seal of said preselected length, wherein said reinforced perimeter seal is reinforced by at least one securement member disposed proximate said perimeter, wherein each said at least one securement member has an upper portion bonded to said first fabric panel and a lower portion bonded to said second fabric panel thereby distributing stress associated with expansion of said roll-over airbag over a larger surface area such that tear stress is transformed by said at least one securement member into a shear stress; and at least one tether defined by a first fabric member having a folded portion and a cooperating second fabric member having a folded portion, said folded portion of said first fabric member being secured to said folded portion of said second fabric member by a securement member, wherein said folded portions of said first and second fabric members have a first preselected width and said securement member has a second preselected width, said first preselected width being greater than said second preselected width.

3. A roll-over airbag for an automobile self-inflating restraint system, said roll-over airbag comprising:

a first fabric panel having a perimeter of a pre-selected length;

a second fabric panel perimetrically bonded to said first fabric panel;

at least one port opening provided in said first fabric panel for connecting said roll-over airbag to an inflator to allow communication of an expansion fluid from the inflator to said roll-over airbag;

at least one securement member disposed proximate said perimeter, each said at least one securement member having an upper portion bonded to said first fabric panel and a lower portion bonded to said second fabric panel thereby distributing stress associated with expansion of said roll-over airbag over a larger surface area; and a passageway disposed through said roll-over airbag whereby a seatbelt can pass through said roll-over airbag, said passageway being defined by a first opening provided in said first fabric panel, a second opening in said second panel in register with said first opening, and an expandable, pleated channel member in register with said first and said second opening, said expandable channel member having a first end bonded to said first fabric panel and a second end bonded to said second fabric panel, whereby an expandable through opening is provided in said roll-over airbag for allowing passage of a seatbelt therethrough and whereby said through opening allows uniform displacement of said first fabric panel from said second fabric panel during inflation of said roll-over airbag.

4. The roll-over airbag of claim 3 wherein said roll-over airbag further comprises at least one tether disposed within said airbag for limiting displacement of said first and second fabric panels from one another, said tether having a first end bonded to said first fabric panel and a second end bonded to said second fabric panel.

* * * * *